C. E. VAN NORMAN.
GRINDING MACHINE.
APPLICATION FILED JAN. 30, 1914.

1,102,558.

Patented July 7, 1914.
5 SHEETS—SHEET 3.

WITNESSES:
W. P. Noble
G. R. Driscoll

INVENTOR,
Charles E. Van Norman,
BY
ATTORNEY

C. E. VAN NORMAN.
GRINDING MACHINE.
APPLICATION FILED JAN. 30, 1914.

1,102,558.

Patented July 7, 1914.
5 SHEETS—SHEET 4.

WITNESSES:
W. P. Noble
G. R. Driscoll

INVENTOR,
Charles E. Van Norman,
BY
ATTORNEY.

UNITED STATES PATENT OFFICE.

CHARLES E. VAN NORMAN, OF SPRINGFIELD, MASSACHUSETTS.

GRINDING-MACHINE.

1,102,558.  Specification of Letters Patent.  Patented July 7, 1914.

Application filed January 30, 1914. Serial No. 815,368.

*To all whom it may concern:*

Be it known that I, CHARLES E. VAN NORMAN, a citizen of the United States of America, and resident of Springfield, in the county of Hampden and State of Massachusetts, have invented certain new and useful Improvements in Grinding - Machines, of which the following is a full, clear, and exact description.

This invention relates to improvements in a grinding machine of a class which is characterized by the provision of a rotary tool spindle, and a head, on which the piece to be worked upon by the grinding wheel or other tool may be carried and rotated, which head is mounted for, and automatically caused to have, oscillation on an axis which is at right angles to the axis of the tool spindle.

The machine of the class to which this invention relates is especially available for the grinding, finishing or polishing of the annular internal ball race grooves in rings employed in ball bearings.

One object of this invention is to provide means of practical and convenient character for throwing the oscillatory work carrying head out of connection from, or into connection with, the mechanism which is included in the machine for imparting mechanically and automatically the partial-rotary reciprocatory motion or oscillation to the head, which means is operable during the action of the oscillation imparting means.

Another object of the invention is to provide means whereby the range of oscillation of the work carrying head, or length of the arc of oscillation may be varied to correspond, for instance, to ball race-grooves in rings of different depths and consequently comprising in the arc conforming to the transverse contour a greater or less number of degrees of a circle.

Another object of the invention is to provide means whereby the region or field of oscillation, to whatever extent such oscillation may be, may be varied.

Another object of the invention is to provide means for causing the oscillation of the work carrying head which is of an improved character and will especially insure a perfectly steady action, providing against any lash or chattering between the tool and the piece being operated upon thereby when the piece has been swung to its limit in one direction and is receding, or about to recede in its reversed swinging movement.

Another object of the invention is to so mount and support the oscillatory work carrying head that the spindle of the chuck or revoluble work holder is supported in a most stable and unyielding manner and especially so that there may be no deflection of the spindle transversely of the axis thereof.

Another object of the invention is to provide mechanism whereby the grinding or finishing action of the rotary tool may be automatically performed in part upon a surface which in transverse contour comprises an arc of a circle and in part upon a surface tangential thereto.

Another object of the invention is to provide improved means for acquiring the cross feed of the support for the rotary tool carrying spindle and means for automatically insuring a cessation of the cross feeding action as predetermined; and other objects of the invention and advantages derived therefrom will be rendered apparent in and by the description hereinafter given.

The invention is described in conjunction with the accompanying drawings and is defined in the claims.

In the drawings: Fig. 5 is a horizontal sectional view taken on the plane indicated by line 5—5, in Figs. 1 and 8. Fig. 6 represents ball race rings of a very common kind and for the grinding of the grooves of which this machine is especially well adapted. Fig. 7 is a diagram to be hereinafter referred to. Fig. 9 is a view similar to Fig. 5 but showing additional provisions required in the machine for the grinding of ball races of the particular kind referred to in the statement of the objects of the invention, Fig. 10 being an illustration of the ball race having the form just referred to. Fig. 11 is a partial plan view, and Fig. 12 is a cross sectional view on line 12—12, Fig. 11 illustrating a capability in the machine which is necessary when the same is equipped for the grinding of ball races of the type shown in Fig. 10. Figs. 13 and 14 are diagrams to represent relations and relative motions of parts to be ground and the particular shapes of such parts. Fig. 15 is a partial elevation showing a device operative for the connection and disconnection of the oscillatory head and the means for imparting the operating movement thereto. Fig. 16 is a plan view especially showing provisions hereinafter referred to.

In the drawings, A represents the supporting frame or bed of the machine mounted on which is the head B in which is journaled the spindle C on an axis which is horizontal and ranging on what is here regarded as the longitudinal line of the machine. The said spindle is represented as being provided with a grinding wheel D; and such spindle is understood as driven at a very high rate of speed through means therefor forming no part of this invention. The lower portion of the head B is formed and engaged for a horizontal cross sliding movement on another slide E which is so mounted on and engaged with the bed or frame A as to be capable of a longitudinal sliding movement relatively thereto. G represents the head in which is rotatively mounted a spindle G² which carries a holder G³ for the annular piece such as represented by $x$ and in which the groove thereon is to be ground and accurately finished. The head G is slidably adjustable on another slide H which in turn is slidably adjustable on a base member J which is mounted for oscillation on the vertical axis represented by the line $y$—$y$, Figs. 1 and 8, and by the axial center indicating points $y$ in Figs. 5, 9, 13, 14 and 16. The movement which the head G which directly carries the work holder G³ has on the slide H is one which is always radial to the center $y$ of oscillation of the base J, while the movement of the slide H is at right angles to such radial-movement-line of the head G.

K represents a post to the upper end of which the base for the work carrying head is connected and by which post when the latter is oscillated the base and head carried thereby are also correspondingly oscillated.

The bed or frame A of the machine at the portion thereof which is under the base J for the work holder carrying head is fitted with a section A² therein of cylindrical form with a central bore therethrough for the accommodation of the post K and constructed with a somewhat massive circular flange A³, the top of which is planed perfectly flat, and finished smooth, and which forms the support for the base which has its oscillation with a comparatively broad surface bearing thereon. The comparatively thick flange A³ of the said section A² of the bed is directly sustained by the portion A⁴ of the bed proper thereunder; and it will be perceived that the base J has a support, at the portion thereof which is under the journal bearing $a$ for the shaft carrying the work holder G³. By this construction the rotary work holder shaft may be run without any deflection and with the utmost steadiness.

L represents an annular member loosely surrounding and revolubly movable relatively to the post K, and in combination with which, mechanism, of a kind hereinafter described, for imparting a partial rotary reciprocatory motion or oscillation to such annular member, is provided. It is to be understood that while the machine is being run, such oscillatory motion of the annular member is constant and a corresponding oscillatory motion of the work carrying head ensues so long as the annular member L is connected with the post K.

For the connection and disconnection of the member L and the post K, parts and constructions are provided as follows: The annular member has in its under side a socket $b$ for a locking pin; $c$ represents a member affixed to the post next below the annular member L and which is provided with the locking pin $d$ fitted to play vertically in a suitable bore therefor in the part $b$ and to engage into and disengage from the aforementioned socket $b$. The locking pin $d$ is extended downwardly and has engagement with a lug or projection $c^2$ of a flanged collar $e$ which is vertically slidable relatively to the lower portion of the post. The spring $e^3$ is so applied as to exert an upward forcing action on the collar so that when permitted, the collar will rise and carry the pin $d$ into locking connection with the annular member L. This is merely one form of a clutch. To operate the collar, a short shaft $e^5$ is rotatively fitted in the side of the frame, the same having an eccentric stud or roller $e^6$ engaging with the flange of the collar $e$, and also a handle by means of which it may be operated.

Figure 8:
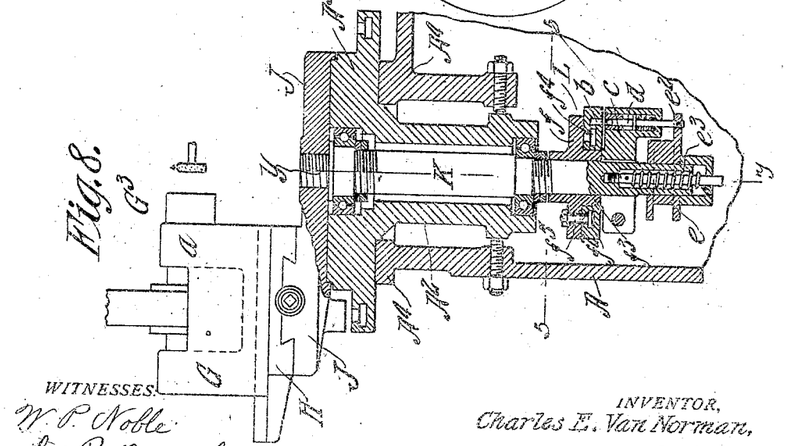
Fig. 8 is a vertical sectional view through the base portion of the oscillatory work carrying support and the parts of the machine located at and adjacent the axis of oscillation.

The part referred to as the annular member L is, as will be perceived in Fig. 8, composed of two sections, the one $f$ being that to which the oscillation imparting link M is connected, while the one $f^2$ is that in which the socket $b$ is provided and in which the engagement of the locking pin $d$ is effected. The section $f$ is made with a hub $f^3$ about which the section $f^2$ is fitted. The one section has an annular T-slot $f^4$ for the reception of the heads and portions of the shanks of bolts $f^5$ which pass through the thickness of the other section, receiving locking nuts thereon. By this provision it is possible by loosening the bolts $f^5$, and rotating the section $f^2$,—which is the one that is locked to and unlocked from the post,—relatively to the section $f$, which is the one having the link connected thereto and cannot be revolubly moved only as the link imparts such movement thereto,—the field of oscillation of the work carrying head, connected by its base J to the post K, may be varied as may be necessary to accord with different characters of work to be performed in the machine.

Figures 5, 6, 7:
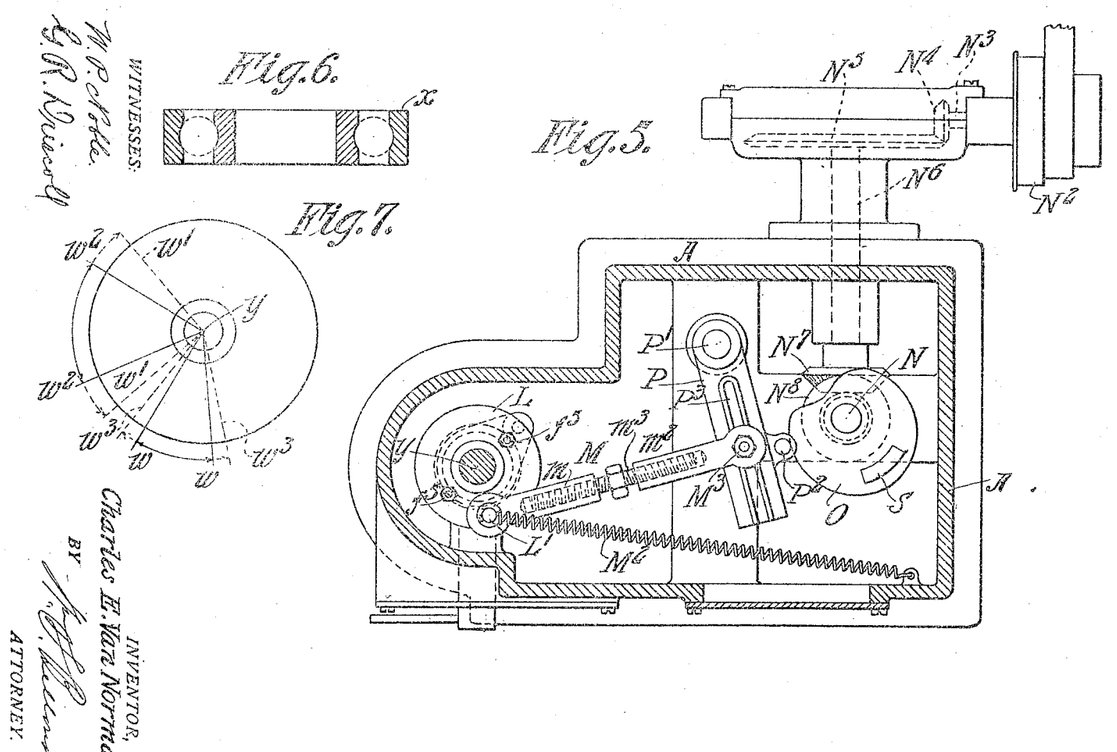

Reference being had to the diagram, Fig. 7, it may be said that the field of oscillation may, for instance, be one limited by the lines $w, w$, or by the adjustment permissible between the sections $f$ and $f^2$ of the annular members, the field of oscillation may be within the limits defined by the line $w^2, w^2$. The dotted lines $w', w'$, as compared with those $w^2$, or those $w^3, w^3$, as compared with those $w$, indicate an extension of the range of the oscillation of the work carrying head which may be accomplished by the oscillation imparting means to be now described, reference being had to Figs. 1 and 5.

N represents a vertical shaft located within the frame of the machine and rotatively driven from the driving pulley $N^2$ on the shaft $N^3$, which by bevel gearing $N^4$, $N^5$, drives a horizontal shaft $N^6$ which by the bevel gears $N^7$ and $N^8$, have connection with the vertical shaft N. The said shaft N has a cam O affixed thereon with the edge of which coacts the roller stud $P^2$ of the lever P pivoted at $P'$ to swing in a horizontal plane and with an intermediate portion of which lever one end of the link M is connected, the other end of such link being by pivot $L'$ connected, as before stated, to the annular member L.

The spring $M^2$ has one end secured to the link which is jointed to the lever, and having its other end secured to a fixed part of the frame and maintains the roller stud $P^2$ always in contact against the edge of the cam and prevents any lash or lost motion especially at the time when the reversals the swing or oscillation of the jointed parts take place, and this is especially advantageous for perfection of the grinding operation of a groove in a ball race ring. A sheave-guided weighted cord connected in the manner the spring is shown to be would be the equivalent thereof.

The pivot connection of the link M and the lever P is an adjustable one by reason of the stud and slot formation represented at $M^3$ and $P^3$ in Fig. 5, so that from a given cam the throw of the lever and the oscillation imparting thrust of the link may be in greater or less extent accordingly as the connection $M^3$ is farther from or nearer to the center $P'$ of swinging motion of the lever; and, therefore, it is manifest in what manner the range or extent of the oscillation of the work holder head may be varied.

It is desirable that the oscillation of the work be just sufficient to carry the groove in the ring being ground back and forth relatively to the edge of the grinding wheel from one edge of the groove to the other,— no scantiness of movement nor over-running of movement being permissible for the best and most speedy accomplishment of the ball groove grinding.

Inasmuch as the distance between the different points of possible attachment of the link along the length of the lever P and the point of the link connection with the annular member L is variable under the different adjustments, the link is made longitudinally distensible and contractible, the same being represented as composed of the sections $m$, $m^2$ and $m^3$, the latter being a right and left hand threaded screw engaging into tapped bores in approached ends of the sections $m$ and $m^2$.

The race ring $x$ which is to have the groove $x^2$ ground therein, is carried in the work holder $G^3$ which is so located, by the proper adjustment of the head G radially relatively to the axis of oscillation indicated by $y$, that the arc of the groove cast or formed in the ring to be finished in this machine is concentric with said axis line: This will be apparent on an inspection of Fig. 13 which shows the axis of oscillation and the limits in opposite directions of the oscillation of the ring which is understood as having rapid rotation imparted thereto through means of the belt and pulley (indicated at $G^2$ in Fig. 1 of the drawings).

The grinding wheel, the high speed spindle of which is mounted on the head B, is, by the cross feed of substantially usual kind which is provided for coaction between the head slide B and the longitudinal or base slide E, carried rearwardly beyond the center of the work holder and race ring therein so that the edge of the wheel will have its grinding contact against the surface of the ball groove,—the automatic character of the cross feed insuring a very slow and limited transverse feeding movement as the grinding action progresses and until the grinding of the groove with precision to the exact extent required shall have been accomplished.

The slide E which is movable longitudinally on the bed has at its end opposite that at which the grinding wheel is located, an adjustable screw stop $g$ so that when the slide is run toward the oscillatory work carrying head it can go no farther than to present the grinding wheel at its proper working position, which is one whereat a plane centrally through such wheel, midway between its opposite faces and at right angles to its axis, intersects the oscillation axis line $y$, such point of intersection being a distance from the edge of the wheel equal to the radius from which the groove in the race ring is generated.

The slide E carries a short upstanding shaft $E^3$ having an operating handle $E^4$ affixed on its upper end and a pinion $E^5$ affixed on its lower end which meshes with the rack bar $E^6$ immovably secured to a part of the bed. By this provision the base slide E and all the equipments thereof may be bodily withdrawn longitudinally to retire the grinding wheel from proximity to the work as frequently desirable for the testing, and for the removal of one piece and the mounting in place of another piece.

The slide B in the head of which the grinding wheel spindle C is carried has the very slow feed motion thereof transversely of the base slide imparted through the feed screw shaft Q, understood as combined with and between the slides B and E in a manner usual and well known; but the particular means devised by me in this machine for automatically imparting the rotary movement to the feed screw and automatically terminating the feed movement at a predetermined time will be now described.

Adjacent and parallel with the feed screw shaft Q is a short shaft $Q^2$ having a ratchet wheel $Q^3$ and a pinion $Q^4$ affixed thereon,—said pinion meshing into a spur gear wheel $Q^5$ fast on the feed screw shaft.

$Q^6$ represents a pivoted and oscillatory pawl carrier adjacent the edge of the ratchet wheel, or with the teeth of which wheel the pawl $Q^7$ engages.

R represents a member mounted for oscillation on the shaft $Q^2$ and substantially radially extended beyond the edge of the ratchet wheel and provided with an adjustable abutment member $R^2$ made in the form of a screw plug and having a thread engagement with the underside of the extremity of the oscillatory member R. The extremity of said member R also has an abutment member $R^3$ for coaction with the pawl carrier.

On the shaft N is a cam S revoluble in a horizontal plane, and this cam advantageously is formed as a protuberance on the upper face of the aforementioned cam O comprised in the means for the oscillation of the work carrying head G. The cam, revolving, imparts a rising, and permits a falling movement of the thrust rod $S^2$ which plays through the top of the bed or machine frame and causes an up and down swinging movement of the tiltable plate $S^3$. The upward swinging movements of said plate as imparted by the cam thrust rod are always in the same extent, but there may be a lost motion between the tiltable plate and the abutment member $R^2$ in amount accordingly as to whether said abutment is screwed considerably upwardly or left considerably protruding below the extremity of the member R. By this means the cross feed motion of the grinder spindle head, always comparatively slow, may be at the maximum of such slight speed or at a very much diminished rate according to the desires or requirements of the operator.

Upon the rear side of the ratchet wheel encircling the short ratchet wheel shaft $Q^2$ is a disk $h$ having an extension $h^2$ to the edge of the ratchet wheel, the extremity of which is forwardly right angularly turned to form a shield $h^3$ which will, when the portion of the ratchet wheel edge relatively to which the shield is adjusted is brought to proximity with the pawl, throw out or prevent the pawl in its reciprocations from taking into the ratchet wheel teeth.

Figures 1, 2, 3, 4:
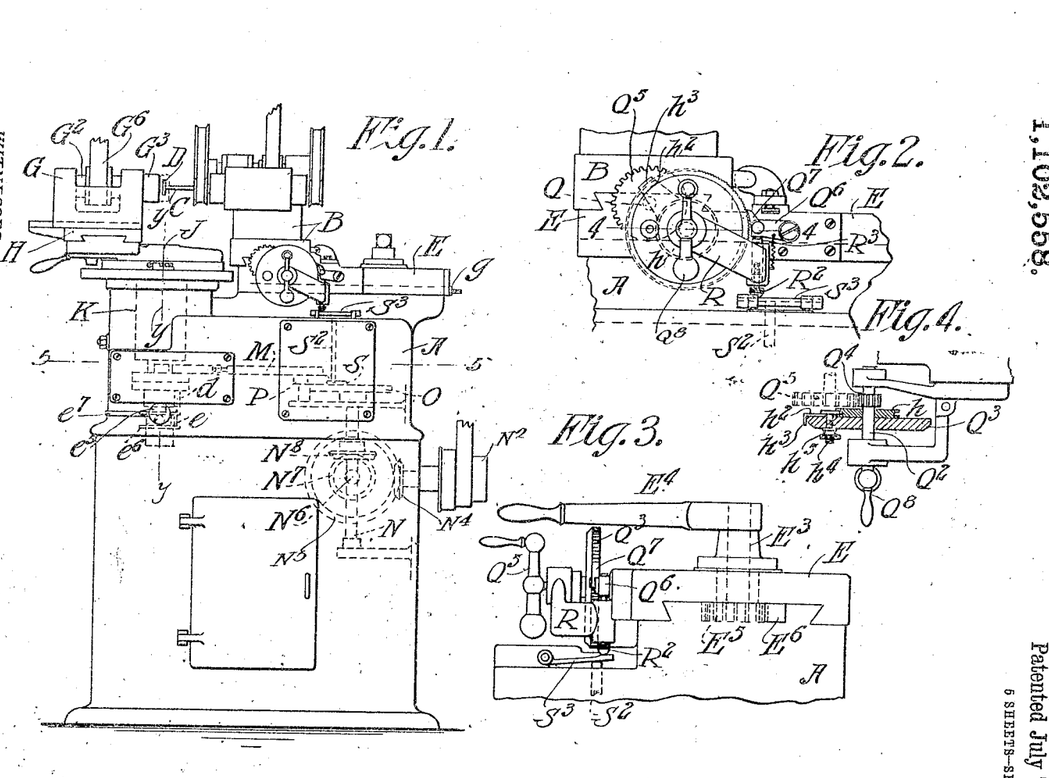
—Figure 1 is a front elevation of the improved grinding machine.
Fig. 2 is a partial front elevation to illustrate the cross feed mechanism for the grinding wheel spindle support.
Fig. 3 is an elevation with parts shown in Fig. 2 as seen at right angles thereto.
Fig. 4 is a partial horizontal sectional view on line 4—4, Fig. 2.

The disk is peripherally grooved as shown in Fig. 4 in which engages the flange or lug at the inner end of a bolt $h^4$, which bolt has the tensioning nut $h^5$ combined therewith in such a manner that when the nut is screwed up against the outer face of the ratchet wheel it will exert a tightening draft on the bolt, causing the head or lug thereof to bind the disk firmly against the rear side of the ratchet wheel. The shield may be revolubly adjusted when the nut is loosened to permit the groove edged disk to freely turn around on the ratchet wheel shaft.

The ratchet wheel shaft is provided with the usual handle $Q^8$ for manually quickly turning it for the quick withdrawal of the head carrying the grinding wheel so that the latter will be transversely displaced whenever desired, from its working location.

The details of construction of the pawl actuating means may be considerably changed without evasion of my claim thereto.

Figures 9, 10:
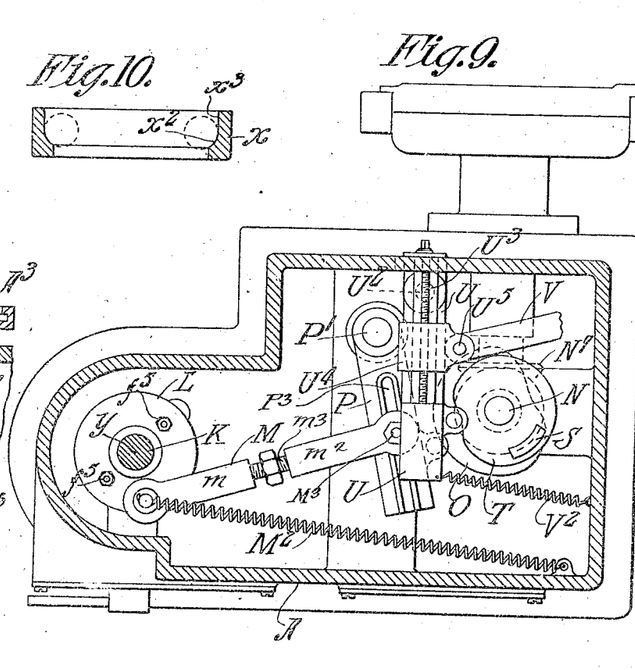
Figures 11, 12, 13, 14, 15:
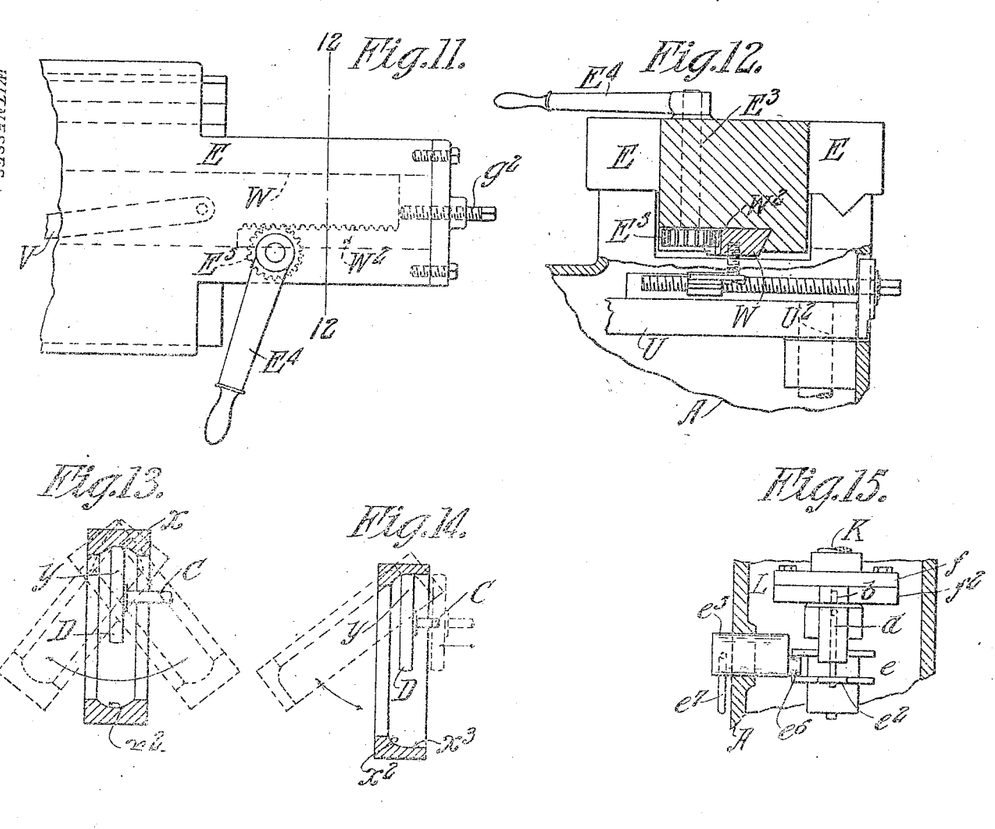

The machine in addition to the grinding or finishing the surfaces of grooves in ball race rings, of the form shown in Fig. 13, is also adapted for the grinding or finishing the surfaces in rings of the type shown in Fig. 14, wherein it is seen that the internal surface in the ring comprises, as considered in cross section, a portion $x^2$ which is the arc of a circle and a portion $x^3$ which is tangential thereto and conformable to the circumference of a cylinder. For the grinding of work of this kind, the work carrying head has an oscillation, as from a position shown in the full lines in Fig. 14 to that shown in dotted lines, and then the work carrying head remaining at rest with the axis of the work parallel with the axis of the grinding wheel spindle, the carrier for the latter spindle has imparted thereto a longitudinal reciprocatory movement for the grinding of the surface $x^3$,—the oscillatory movement of the work carrying head and the reciprocation of the grinding wheel being alternated. And for the performance of work of the character just above mentioned, the machine is equipped as represented in Fig. 9, with a cam T, on the shaft N, and additional to the cam O, the function of which has been hereinbefore fully stated. With this cam T coacts a lever U pivoted at $U^2$ and having adjustably connected along the length thereof a link V having connection with the slide E. The spring $U^2$ has connection with the lever U for maintaining the roller stud thereof at all times in edgewise contact against the cam. The lever U has a screw shaft $U^3$ mounted thereon and in such arrangement that it may be conveniently turned, such screw shaft being operative to adjust the position, as may be required of the block $U^4$ to which by the pivot $U^5$ the connection between the link V and the lever U is made,—this providing for required variations in the longitudinal movement of the base slide for the grinding wheel spindle.

The base slide E, represented in Figs. 11 and 12, is made with the supplemental member W to which the link V is connected. This member W has rack teeth $W^2$ thereon with which meshes the pinion $E^5$ on the shaft $E^3$ which is provided with the hand operating lever $E^4$, said shaft being mounted in the slide proper E. In this instance the adjustable screw stop $g^2$ carried by the base slide E has its limiting abutment against the end of the supplemental slide member W, as indicated in Fig. 11.

Under working conditions the hand lever $E^4$ is swung to cause the base slide E to be moved to its limit in the direction of the oscillatory work carrying head,—the engagement between the pinion $E^5$ and rack $W^2$ maintaining these parts in set relations but permitting the purposed movement of the base slide E for the withdrawal of the grinding wheel, on the line of its axis, out of proximity to the ring being worked upon when such temporary positioning is desirable.

The machine may be made with equipments herein just described in conjunction with Figs. 9, 11, and 12, which are so conditioned that the means for imparting the automatic longitudinal reciprocation of the base slide may be removed, or thrown out of connection and rendered inoperative when only the oscillation of the work carrying head relatively to the grinding wheel revoluble in a fixed position is necessary. And it is to be noted that when the machine is being employed for a grinding of arc grooves in ball races such as shown in Fig. 15, the cam O will be of a shape to cause, after the swinging of the work carrying head in one direction, the immediate reverse swinging thereof without "dwell" between the movements; but where the race ways of the type represented in Fig. 14 are being ground in the machine, the cam of the kind just above mentioned is interchanged for one which will insure a dwell of the work carrying head at a time when the spindle thereof is parallel with the axis of the grinding wheel spindle.

Figure 16:
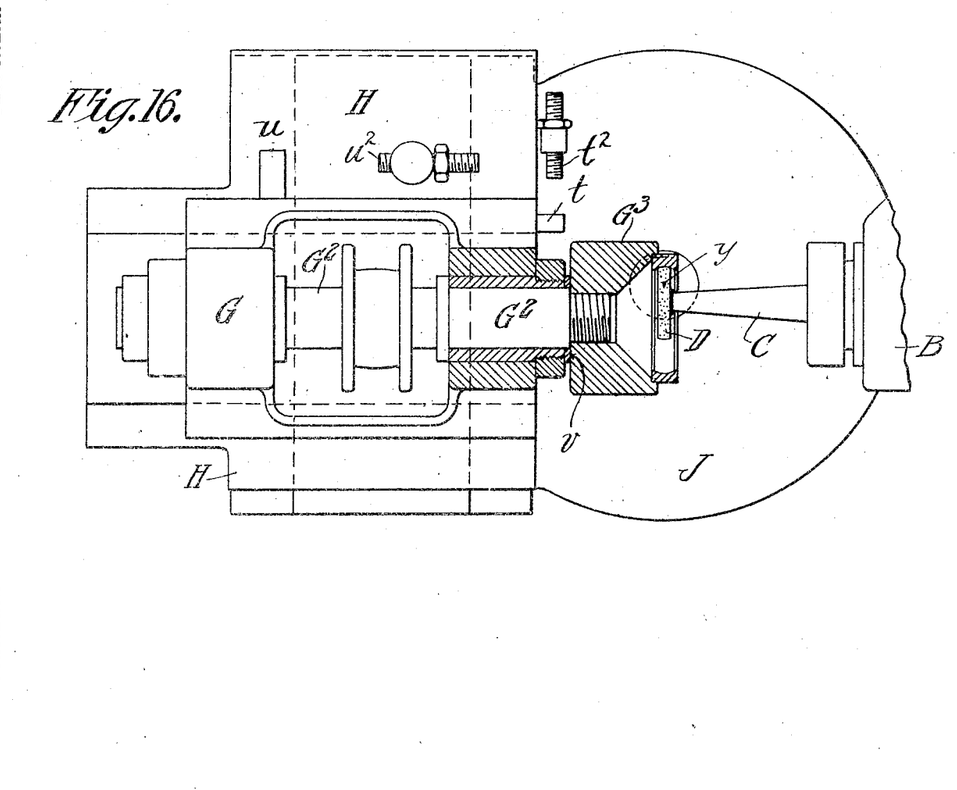

In Fig. 16 the slide H which is movable transversely of a line radial to the axis $y$ of oscillation of the head supporting base J is provided with a stop $t$ which is coöperative with a stop $t^2$ on the base J, and the slide G which is movable on the slide H on a line radial to the said axis $y$ of oscillation has a stop $u$ which is coöperative with a stop $u^2$ on the slide $h$. These two sets of stops have such relations that when respectively simultaneously brought to coincidence they determine an invariable relation of the work holder spindle to the said axis $y$ of oscillation; and they serve as datums of measurement for adjustably positioning the slidable members to insure that differently sized grooved pieces to be operated upon of known dimensions carried by the spindle and having known relations to the latter, as determined by the dimensions of the work holder at $G^3$ shall be supported so that the center from which the arc of the groove in the piece of work is generated is exactly at the said axis of oscillation.

As worked out in practice, the outer face of the shoulder or collar $v$ of the spindle is to be considered as the point or surface which may be brought to an invariable relation to the aforementioned axis of oscillation when the stops $u$ and $u^2$ are brought to abutment; and the axis of the spindle will always intersect the axis of oscillation when the stops $t$ and $t^2$ are brought to abutment; therefore, by having gage plugs,—rods or bars with their ends right angular to their lengths,—respectively corresponding to work holders $G^3$ of different lengths, plug half the width of the ring to be grooved, and to the distance from the center of the ring to the point $y$ from which the arc groove is generated, such gage plugs by being mounted to determine the separations between the stops $u$ and $u^2$, $t$ and $t^2$, will insure that the work carrying head with the ring or piece to be operated upon will be positioned exactly so that the arc center and the axis of oscillation $y$ will be coincident as is absolutely necessary for the proper operation of the machine.

Of course, instead of the employment of gage plugs as hereinabove mentioned to be supplied in sets corresponding to different work holders, a measure scale could be employed; but it is preferred to provide the gage plugs for precision of results and the avoidance of possible mistakes; and by the provisions of the gage stops an unskilled person may secure the proper adjustment or positioning of the work carrying head for the performance of any given work without being required to understand the principles or reasons why the exact positioning is acquired.

I claim:—

1. In a machine of the character described, in combination, a spindle carrying a rotary tool and means for rotatively driving it, a work carrying head mounted for oscillation on an axis angular to the axis of the tool spindle, means for imparting oscillatory movement to said head which is adapted to be connected with and disconnected from the latter, and means located on a fixed part of the machine and adapted to control the action of the connecting and disconnecting means.

2. In a machine of the character described, in combination, a spindle carrying a rotary tool and means for rotatively driving it, a work carrying head located for oscillation on an axis angular to the axis of the tool spindle, a member adapted to move in coöperative axial relation with said head, means for adjusting the field of oscillation of said member and head, means for imparting oscillatory movement to said member, means for disconnecting said member and oscillation imparting mechanism and for re-connecting at the proper location, and means located on a fixed part of the machine and adapted to control the action of the connecting and disconnecting means while the oscillation imparting mechanism is in motion.

3. In a machine of the character described, in combination, a spindle carrying a rotary tool and driving means therefor, a head mounted for oscillation, a vertical pivotal post connected with said head, a spindle journaled in said head, and means for imparting oscillatory movement to the head, a bed on the top of which the base of said head has a surface contacting bearing support, a supporting portion of such contact surface having a location directly under a substantial bearing portion of the length of the spindle journaled in said head, and means for constituting a journal bearing for the said vertical post.

4. In a machine of the character described, in combination, a horizontal rotary tool carrying spindle and means for driving it, a head arranged for oscillation on a vertical axis, and having a journal support, in which a rotary work carrying shaft is mounted, a bed on the top of which the base of said head has a surface contacting bearing support, a supporting portion of such contact surface having a location directly under a substantial portion of the length of the spindle journaled in said head, means for imparting oscillatory motion to said head, and means for disconnecting the head and the motion imparting means therefor, and for reconnecting them in proper relation which means are operable during the action of the oscillation motion imparting means.

5. In a machine of the character described, in combination, a bed, a feed-slide, having a horizontal tool carrying spindle movably mounted on the bed, a vertical post, to be oscillated, having bearing supports within the bed, a head having a horizontal work-carrying shaft, the base of which head is connected to an upper portion of said post, an annular member, surrounding, and revolubly movable relatively to, the post, a member affixed to the post adjacent the annular member, means for detachably locking said members together, while the means for oscillating the annular member are in motion.

6. In a machine of the character described, in combination, a bed, a feed-slide, having a horizontal tool carrying spindle movably mounted on the bed, a vertical post, to be oscillated, a head, the base of which is connected to an upper portion of said post, and having a horizontal work carrying shaft, an annular member, surrounding, and revolubly movable relatively to, the post, a member affixed to the post adjacent the annular member, and provided with a locking device vertically movable and adapted for a locking engagement with, and disconnection from, said annular member, a collar slidable on the post and having an actuation connection with the locking device and means for slidably operating the collar.

7. In a machine of the character described, in combination, a bed, a feed-slide, having a horizontal tool carrying spindle movably mounted on the bed, a vertical post, to be oscillated, a head, the base of which is connected to an upper portion of said post, and having a horizontal work carrying shaft, an annular member, surrounding, and revolubly movable relatively to, the post, and having in its under side a socket, a member affixed to the post adjacent the annular member, and provided with a locking pin vertically movable and adapted for a locking engagement in, and disengagement from, said socket, a flanged collar slidable on the post and having a connection with the locking pin, and a rotative element having an eccentric projection in engagement in the flange of said collar.

8. In a machine of the character described, in combination, a bed, a feed-slide, having a horizontal tool carrying spindle movably mounted on the bed, a vertical post to be oscillated, a head, having a horizontal work carrying shaft, and having the base thereof connected to the upper end of the post, an annular member, surrounding, and revolubly movable relatively to, the post, and composed of two sections, one of which is revolubly adjustable relatively to the other, with means for confining said sections in their adjusted relations, a member affixed to the post adjacent the sectionally composed annular member, means for detachably locking the post affixed member and one section of the annular members together, and means for oscillating the other section of the annular member.

9. In a machine of the character described, in combination, a spindle carrying a rotary tool and driving means therefor, a work carrying head mounted for oscillation on an axis angular to the axis of the tool spindle and cam actuated mechanism for imparting oscillatory movement to the head, which mechanism comprises means operable for a retractile action coacting with the motion imparting means, and means for increasing and diminishing the range of oscillation.

10. In a machine of the character described, in combination, a spindle carrying a rotary tool and driving means therefor, a work carrying head mounted for oscillation on an axis at right angles to the axis of the tool spindle, a cam, and means with which the cam coacts for imparting oscillatory movement to the head, and means whereby the field of oscillation of the head may be changed.

11. In a machine of the character described, in combination, a spindle carrying a rotary tool and driving means therefor, a work carrying head mounted for oscillation on an axis angular to the axis of the tool spindle and a cam, and means with which the cam coacts for imparting oscillatory movement to the head, which mechanism comprises means for increasing and diminishing the range of oscillation, and means whereby the field of oscillation of the head may be changed.

12. In a machine of the character described, in combination, a spindle carrying a rotary tool and means for rotatably driving it, a work carrying head and a post with which it is connected mounted for oscillation on an axis angular to the axis of the tool-spindle, a member and means for connecting it to the post, a cam, a pivoted lever with which the cam coacts, and a link connected to the lever and to the said member appurtenant to the post.

13. In a machine of the character described, in combination, a spindle carrying a rotary tool and means for rotatively driving it, a work carrying head and a post with which it is connected mounted for oscillation on an axis angular to the axis of the tool-spindle, a member and means for connecting it to the post, a cam, a pivoted lever with which the cam coacts, and a link, composed of separate sections, which are longitudinally distensibly and contractibly adjustably connected, connected to the lever and to the said member appurtenant to the post.

14. In a machine of the character described, in combination, a spindle carrying a rotary tool and means for rotatively driving it, a work carrying head and a post with which it is connected mounted for oscillation on an axis angular to the axis of the tool-spindle, a member and means for connecting it to the post, a cam, a pivoted lever with which the cam coacts, a link connected to the lever and to the said member appurtenant to the post, and means operable for a retractile action on the connected link and lever.

15. In a machine of the character described, in combination, a spindle carrying a rotary tool and means for rotatively driving it, a work carrying head mounted for oscillation on an axis angular to the axis of the tool-spindle, a cam, a pivoted lever with which the cam coacts, and a link, connected to the lever and having an oscillation imparting connection with the work carrying head.

16. In a machine of the character described, in combination, a spindle carrying a rotary tool and means for rotatively driving it, a work carrying head mounted for oscillation on an axis angular to the axis of the tool-spindle, a cam, a pivoted lever with which the cam coacts, a link, and means for adjustably pivotally connecting the lever at different points along the length of the latter, said link also having an oscillation imparting connection with the work carrying head.

17. In a machine of the character described, in combination, a spindle carrying a rotary tool and means for rotatively driving it, a work carrying head mounted for oscillation on an axis angular to the axis of the tool-spindle, a cam, a pivoted lever with which the cam coacts, a link composed of suitably formed members which are distensibly and contractibly connected, and means for adjustably pivotally connecting the lever at different points along the length of the latter, said link also having an oscillation imparting connection with the work carrying head.

18. In a machine of the character described, in combination, a spindle for carrying a rotary tool, a support for said spindle, slidably movable, and driving means for the spindle, a work carrying head mounted for oscillation on an axis angular to the axis of the tool spindle and relatively to which the latter is coöperatively arranged, and respective automatically operated mechanism for alternately imparting oscillatory movement to the head, and a reciprocatory movement to said spindle support.

19. In a machine of the character described, a spindle, for carrying a rotary tool, a support for said spindle slidably movable in the direction of the line of the axis of the spindle carried thereby, and driving means for the spindle, a work carrying head mounted for oscillation on an axis angular to the axis of the tool spindle and relatively to which the latter is coöperatively arranged, respective mechanism for alternately imparting oscillatory movement to the head, and a reciprocatory movement to said spindle support, said spindle support comprising a member by which the spindle is carried, and a member, slidable relative thereto, with which the mechanism for imparting the reciprocatory movement to such support is connected, and means combined with the members of said support for both connecting them as a unit and for causing a sliding movement of the one relatively to the other, for the withdrawal of the spindle carrying tool from the working position relatively to the oscillatory work holding head.

20. In a machine of the character described, a spindle carrying a rotary tool, a support for said spindle, slidably movable, and driving means for the spindle, a work carrying head mounted for oscillation on an axis angular to the line of movement of the tool spindle support and relatively to which the latter is coöperatively arranged, respective mechanism for alternately imparting oscillatory movement to the head, and a reciprocatory movement to said spindle support angular to the axis of oscillation of said head, said spindle support comprising a member on which the spindle is directly supported, and a member, slidable relative thereto, with which the mechanism for imparting the reciprocatory movement to such support is connected, means combined with the members of said support for causing a sliding movement of the one relatively to the other, for the withdrawal of the spindle carrying tool from the working position relatively to the oscillatory work holding head, and an adjustable stop, up to which the member which directly supports the tool spindle may be brought in its movement toward the work holder carrying head.

21. In a machine of the character described, a spindle carrying a rotary tool, a support for said spindle which is slidably movable, and driving means for the spindle, an oscillatory work carrying head relatively to which the tool spindle is coöperatively arranged, mechanism for imparting a reciprocatory movement to said tool spindle support angular to the axis of oscillation of the head, said spindle support comprising a member by which the spindle is carried, and a member, slidable relative thereto with which the mechanism for imparting the reciprocatory movement to such support is connected, and means combined with said members for causing a sliding movement of the one relatively to the other, for the withdrawal of the spindle carrying tool from its working position relatively to the work holding head.

22. In a machine of the character described, in combination, a support carrying a rotary tool spindle which is slidably mounted, a work carrying head mounted for oscillation on an axis angular to the line of movement of the tool spindle support, a rotary shaft having two cams thereon, pivoted levers with which the cams coact, and links connected to said levers, one thereof having an oscillation imparting connection with the tool carrying head, and the other a reciprocation imparting connection with the said slidable tool spindle support.

23. In a machine of the character described, in combination, a rotary tool spindle and a support therefor which is slidably mounted and which is composed of two members, the first carrying the spindle and adapted for a slide movement relatively to the second member, rack teeth on the second member and a gear rotatively mounted on the first member and engaging the rack teeth, and a handle for normally rotating the gear, a work carrying head mounted for oscillation on an axis angular to the line of movement of the tool spindle support, a rotary shaft having two cams thereon, pivoted levers with which the cams coact, and links connected to said levers, one thereof having an oscillation imparting connection with the tool carrying head, and the other a reciprocation imparting connection with the aforenamed second member of said slidable tool spindle support.

24. In a machine of the character described, in combination, a work carrying head mounted for oscillation and means for imparting oscillatory movement thereto, a spindle for carrying a rotary tool arranged angular to the axis of oscillation of said head, a slide movable along a line parallel with the spindle axis, and a slide by which the spindle is directly carried movable on the first named slide transversely of the line of movement of such slide and having a feed screw, a ratchet wheel having driving connection with the feed screw, a swinging pawl carrier provided with a pawl coacting with the ratchet wheel, and means for automatically imparting a swinging movement to the pawl carrier.

25. In a machine of the character described, in combination, a work carrying head mounted for oscillation and means for imparting oscillatory movement thereto, a spindle for carrying a rotary tool arranged angular to the axis of oscillation of said head, a slide movable along a line parallel with the spindle axis, and a slide by which the spindle is directly carried movable on the first named slide transversely of the line of movement of such slide and having a feed screw; a ratchet wheel having driving connection with the feed screw, a swinging pawl carrier provided with a pawl coacting with the ratchet wheel, and means for automatically imparting a swinging movement to the pawl carrier, which means has provision for a lost motion in its coaction with the pawl carrier, and which provision is adapted for variation of the degree of the lost motion.

26. In a machine of the character described, in combination, a work carrying head mounted for oscillation on a vertical axis and means for imparting oscillatory movement to said head, a spindle for carrying a rotary tool, arranged with its axis angular to the axis of oscillation of said head, a base slide movable along a line parallel with the spindle axis, and a slide, by which the spindle is directly carried, movable on the first named slide transversely of the line of movement of the first named slide, and having a feed screw, a ratchet wheel having driving connection with the feed screw, a swinging pawl-carrier and a pawl thereon coacting with the ratchet wheel, a member mounted for oscillation adjacent the pawl carrier and provided with an abutment member, a rotary cam, a thrust rod actuated thereby, and a pivotally mounted and tiltable plate adapted to be swung by the thrust rod and coacting with the said abutment member.

27. In a machine of the character described, in combination, a work carrying head mounted for oscillation on a vertical axis and means for imparting oscillatory movement to said head, a spindle carrying a rotary tool, arranged with its axis horizontal and at right angles to the axis of oscillation of said head, a base slide movable along a line parallel with the spindle axis, and a slide by which the spindle is carried, movable on the first named slide transversely of the first named slide, and having a feed screw, a ratchet wheel having driving connection with the feed screw, a pawl carrier and a pawl thereon coacting with the ratchet wheel, a member mounted for oscillation adjacent the pawl carrier and provided with an abutment member, a rotary cam, a thrust rod actuated thereby, and a pivotally mounted and tiltable plate adapted to be swung by the thrust rod and coacting with the said abutment member, said abutment member and plate being related for a lost motion engagement and means for varying the extent of the lost motion relatively between said parts.

28. In a machine of the character described, in combination, a work carrying head mounted for oscillation on a vertical axis, a spindle carrying a rotary tool arranged with its axis horizontal and angular to the axis of oscillation of said head and mounted for a movement substantially transverse of the axis of the tool carrying spindle, a mechanism for imparting both an oscillatory movement to the work carrying head and a transverse feed movement to the tool carrying spindle, and means for terminating the transverse movement of the mounting for the tool spindle after the feed movement has progressed to a predetermined point.

29. In a machine of the character described, in combination, a work carrying head mounted for oscillation and actuating means for imparting oscillatory movement thereto, a spindle carrying a rotary tool arranged with its axis angular to the axis of oscillation of said head, a base support manually movable along the line of the spindle axis, and a slide by which the tool spindle is directly carried slidable transversely of the base slide, feed mechanism coacting with said slide for imparting feed motion to the transversely movable slide while the base slide remains stationary, means connecting the feed mechanism and the oscillatory head actuating mechanism, and means for stopping the action of the feed mechanism at any predetermined point.

30. In a machine of the character described, in combination, a work carrying head mounted for oscillation on a vertical axis and means for imparting oscillatory movement to said head, a spindle carrying a rotary tool, arranged with its axis horizontal and at right angles to the axis of oscillation of said head, a base slide movable along the line of the spindle axis and a slide, by which the spindle is directly carried, movable on the first named slide transversely of the spindle axis and having a feed screw, a ratchet wheel having driving connection with the feed screw, an oscillatory pawl carrier and a pawl thereon coacting with the ratchet wheel, a member mounted for oscillation adjacent the pawl carrier and provided with an adjustable abutment member, a rotary cam, a thrust rod, actuated thereby, a pivotally mounted and tiltable plate adapted to be swung by the thrust rod and coacting with the said adjustable abutment member, a shield adapted to overlie a portion of the toothed edge of the ratchet wheel, revolubly adjustable relatively to the latter and having means for its adjustment and operative after a predetermined rotative movement of the ratchet wheel to force the pawl to a position of disengagement relatively to the ratchet wheel.

31. In a machine of the character described, a base member mounted for oscillation and a pair of slide members carried by the base, one of which is movable on a line radial to the axis of oscillation and the other movable on a line at right angles thereto, one of said members comprising a head having a rotary work holder spindle journaled therein, coöperative gage devices respectively on the base member and the member slidable therein, and on the radially slidable member and the member which is slidable right angularly thereto, all of which devices when respectively and simultaneously brought to coincidence determine an invariable relation of the work holder spindle to the said axis of oscillation, and which serve as datums of measurement for adjustably positioning the slidable members to insure that differently sized grooved pieces, to be operated upon, of known dimensions, carried by the spindle, and having known relation to the latter, shall be supported so that the center from which the arc of the groove in the piece is generated is exactly at the said axis of oscillation.

32. In a machine of the character described, a base member mounted for oscillation and a pair of slide members carried by the base, one of which is movable on a line radial to the axis of oscillation and the other movable on a line at right angles thereto, one of said members comprising a head having a rotary work holder spindle journaled therein, coöperative gage stops on the base member and the member slidable thereon, and coöperative gage stops on the radially slidable member and the member which is slidable right angularly thereto, which stops are so arranged that when the slide members are positioned to bring the stops of the pairs to abutment one with another, the work holder spindle is brought to an invariable relation to the said axis of oscillation.

Signed by me at Springfield, Mass., in presence of two subscribing witnesses.

CHARLES E. VAN NORMAN.

Witnesses:
WM. S. BELLOWS,
G. R. DRISCOLL.